United States Patent
Cui et al.

(10) Patent No.: US 11,344,889 B2
(45) Date of Patent: May 31, 2022

(54) MICROFLUIDIC CHIP, DETECTING AND DRIVING METHOD THEREOF, AND ON-CHIP LABORATORY SYSTEM

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Haochen Cui, Beijing (CN); Peizhi Cai, Beijing (CN); Chuncheng Che, Beijing (CN); Fengchun Pang, Beijing (CN); Yingying Zhao, Beijing (CN); Yue Geng, Beijing (CN); Le Gu, Beijing (CN); Nan Zhao, Beijing (CN); Yuelei Xiao, Beijing (CN); Hui Liao, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 296 days.

(21) Appl. No.: 16/603,648

(22) PCT Filed: Apr. 26, 2019

(86) PCT No.: PCT/CN2019/084635
§ 371 (c)(1),
(2) Date: Oct. 8, 2019

(87) PCT Pub. No.: WO2020/029609
PCT Pub. Date: Feb. 13, 2020

(65) Prior Publication Data
US 2021/0322973 A1    Oct. 21, 2021

(30) Foreign Application Priority Data

Aug. 9, 2018   (CN) .......................... 201810904259.7

(51) Int. Cl.
*B01L 3/00* (2006.01)
*G01N 27/02* (2006.01)

(52) U.S. Cl.
CPC .......... *B01L 3/50273* (2013.01); *G01N 27/02* (2013.01); *B01L 2200/10* (2013.01);
(Continued)

(58) Field of Classification Search
CPC ......... B01L 3/50273; B01L 2300/0819; B01L 2400/0415; B01L 2300/161;
(Continued)

(56) References Cited

U.S. PATENT DOCUMENTS

| 5,488,866 A | 2/1996 | Ravel et al. |
| 2004/0211659 A1* | 10/2004 | Velev ................. B01L 3/50273 204/164 |

(Continued)

FOREIGN PATENT DOCUMENTS

| CN | 101294971 A | 10/2008 |
| CN | 101788515 A | 7/2010 |

(Continued)

OTHER PUBLICATIONS

International Search Report dated Jul. 16, 2019, issued in counterpart application No. PCT/CN2019/084635. (11 pages).
(Continued)

*Primary Examiner* — Jennifer Wecker
*Assistant Examiner* — Jonathan Bortoli
(74) *Attorney, Agent, or Firm* — WHDA, LLP (57) ABSTRACT

The embodiments of the present disclosure relate to a microfluidic chip. The microfluidic chip may include a
(Continued)

substrate. The substrate may include an electrode layer on a base substrate, a dielectric layer on the electrode layer, and a lyophobic layer on the dielectric layer. The electrode layer may include a plurality of electrode units. Each of the plurality of electrode units may be configured to realize both droplet detection and droplet driving in response to a detection signal and a driving signal respectively.

15 Claims, 5 Drawing Sheets

(52) U.S. Cl.
CPC .................. *B01L 2300/0645* (2013.01); *B01L 2300/0819* (2013.01); *B01L 2300/161* (2013.01); *B01L 2400/022* (2013.01); *B01L 2400/0415* (2013.01)

(58) Field of Classification Search
CPC ........... B01L 2400/022; B01L 2200/10; B01L 2300/0645; G01N 27/02
See application file for complete search history.

(56) References Cited

U.S. PATENT DOCUMENTS

| | | | |
|---|---|---|---|
| 2010/0000620 A1* | 1/2010 | Fouillet | B01L 3/50273 137/827 |
| 2015/0185933 A1* | 7/2015 | Zhang | G06F 3/0446 345/174 |
| 2016/0259199 A1* | 9/2016 | Zhao | G02F 1/1336 |
| 2016/0296934 A1 | 10/2016 | Dong et al. | |
| 2017/0076676 A1 | 3/2017 | Hadwen | |
| 2019/0070602 A1 | 3/2019 | Han et al. | |

FOREIGN PATENT DOCUMENTS

| | | |
|---|---|---|
| CN | 102095770 A | 6/2011 |
| CN | 103170383 A | 6/2013 |
| CN | 103170384 A | 6/2013 |
| CN | 103412024 A | 11/2013 |
| CN | 105413765 A | 3/2016 |
| CN | 107583694 A | 1/2018 |
| CN | 107727845 A | 2/2018 |
| CN | 108226261 A | 6/2018 |
| CN | 108291884 A | 7/2018 |
| CN | 109078661 A | 12/2018 |

OTHER PUBLICATIONS

Office Action dated Jul. 30, 2019, issued in counterpart CN Application No. 201810904259.7, with English Translation. (19 pages).
Office Action dated Jan. 8, 2020, issued in counterpart CN Application No. 201810904259.7, with English Translation. (27 pages).

* cited by examiner

MICROFLUIDIC CHIP, DETECTING AND DRIVING METHOD THEREOF, AND ON-CHIP LABORATORY SYSTEM

CROSS-REFERENCE TO RELATED APPLICATIONS

This application claims benefit of the filing date of Chinese Patent Application No. 201810904259.7 filed on Aug. 9, 2018, the disclosure of which is hereby incorporated in its entirety by reference.

TECHNICAL FIELD

The disclosure relates to the field of microfluidic technology, in particular, to a microfluidic chip, a detecting and driving method thereof and an on-chip laboratory system.

BACKGROUND

Microfluidics is an emerging interdisciplinary technology involving chemistry, fluid physics, microelectronics, new materials, biology, and biomedical engineering that enables precise control and manipulation of tiny droplets. Apparatus using microfluidic technology, often referred to as microfluidic chips, are an important part of the on-chip laboratory system, through which samples of various cells can be cultured, moved, detected and analyzed in the microfluidic chips. Microfluidic chips have a wide range of applications not only in chemistry and medical fields, but also receiving increasing attention in other fields.

The mainstream driving method of the microfluidic chip is electrode driving based on dielectric wetting technology, which is also called a voltage microfluidic chip. The principle is that a droplet is placed on a surface with a lyophobic layer, and then by means of electro-wetting effect and by applying a voltage to the droplet, the wettability between the droplet and the lyophobic layer is changed. As a result, a pressure difference and an asymmetrical deformation are generated inside the droplet, thereby realizing directional movement of the droplet.

At present, most of the existing on-chip laboratory systems adopt a structure in which droplet driving and detecting are separately performed. That is, droplet driving is performed by a microfluidic chip, but biochemical detection of droplets is realized by an external apparatus such as an optical microscope. The existing method makes the on-chip laboratory system complicated in structure and difficult to operate. Thus, it is not only difficult to achieve miniaturization, but also has low degree of automation, which affects negatively the promotion and application of the on-chip laboratory system to a certain extent.

BRIEF SUMMARY

An embodiment of the present disclosure provides a microfluidic chip. The microfluidic chip may include a substrate. The substrate may include an electrode layer on a base substrate, the electrode layer comprising a plurality of electrode units, a dielectric layer on the electrode layer, and a lyophobic layer on the dielectric layer. Each of the plurality of electrode units is configured to realize both droplet detection and droplet driving in response to a detection signal and a driving signal respectively.

Optionally, each of the electrode units comprises a plurality of first electrodes and a plurality of second electrodes disposed at intervals.

Optionally, each of the first electrodes and each of the second electrodes are in a strip shape.

Optionally, the strip shape has a length of about 3 mm to about 5 mm and a width of about 100 µm to about 500 µm, and the intervals between the first electrodes and the second electrodes are in a range about 10 µm to 50 µm.

Optionally, each of the electrode units further comprise a first connecting block connecting first ends of the first electrodes and a second connecting block connecting second ends of the second electrodes, thereby forming an array of interdigital electrodes.

Optionally, the microfluidic chip further comprises a plurality of first input electrodes and a plurality of second input electrodes, each of the plurality of first input electrodes being connected to a first connecting block of one electrode unit, each of the plurality of second input electrodes being connected to a second connecting block of one electrode unit, wherein the first input electrodes and the second input electrodes are configured to input the detection signal and the drive signal to the first electrodes and the second electrodes through the first connecting block and the second connecting block respectively.

Optionally, each of the plurality of first electrodes and each of the plurality of second electrode are in a block shape.

Optionally, the block shape has a length of about 100 µm to about 500 µm and a width of about 100 µm to about 500 µm, and the intervals between the first electrodes and the second electrodes are in a range of about 10 µm to about 50 µm.

Optionally, each of the electrode units further comprise a first connection line and a second connection line, the first connection line connecting all of the plurality of first electrodes, the second connection line connecting all of the plurality of second electrodes, thereby forming a matrix form of electrode array.

Optionally, the microfluidic chip further comprises a plurality of first input terminals and a plurality of second input terminals, each of the first input terminals being connected to a first connection line of one electrode unit, each of the second input terminals being connected to a second connection line of one electrode unit, and the first input terminals and the second input terminals are configured to input the detection signal and the drive signal to the first electrodes and the second electrodes through the first connection line and the second connection line, respectively.

Optionally, each of the plurality of electrode units has a square or rectangle shape, with a side length of about 3 mm to about 5 mm, and an interval between two adjacent electrode units is about 0.3 mm to about 0.5 mm.

Optionally, the detection signal comprises a first alternating current signal having a voltage value of about 5 mV to about 100 mV and a frequency of about 10 Hz to about 1 MHz; and the driving signal comprises a second alternating current signal having a voltage value of about ±30 V to 100 V and a frequency of about 1 kHz to 2 kHz.

Optionally, the microfluidic chip further comprises an opposite substrate, wherein the opposite substrate comprising a base substrate and a lyophobic layer, and the droplets are disposed between the lyophobic layers of the substrate and the opposite substrate.

Optionally, the microfluidic chip further comprises a liquid storage zone and a waste liquid zone, wherein the liquid storage zone is configured for adding a test sample to the electrode units, the waste liquid zone is configured for receiving a test sample flowing out of the electrode units, the plurality of electrode units being disposed between the liquid storage zone and the waste liquid zone.

Another example of the present disclosure is an on-chip laboratory system, comprising the microfluidic chip according to one embodiment of the present disclosure.

Another example of the present disclosure is a detection and driving method of a microfluidic chip, wherein the microfluidic chip comprising an electrode layer, a dielectric layer and a lyophobic layer sequentially formed on a base substrate, and the electrode layer comprising a plurality of electrode units arranged regularly. The detection and driving method may include performing droplet detection using a first electrode unit, wherein the first electrode unit is an electrode unit corresponding to a position of droplet; and performing droplet driving using a second electrode unit to move the droplet to a position corresponding to the second electrode unit. The second electrode unit is adjacent to the first electrode unit.

Optionally, performing droplet detection using the first electrode unit comprises inputting a detection signal to the first electrode unit; and reading impedance signal generated by the first electrode unit and outputting the impedance signal to an external processing circuit for processing.

Optionally, each of the electrode units comprises a plurality of first electrodes and a plurality of second electrodes disposed at intervals, inputting the detection signal to the first electrode unit comprises inputting a first alternating current signal having a voltage value of about 5 mV to about 100 mV and a frequency of about 10 Hz to about 1 MHz to the plurality of first electrodes and the plurality of second electrodes in the first electrode unit.

Optionally, performing the droplet driving using the second electrode unit to move the droplet to the position corresponding to the second electrode unit comprises inputting a driving signal to the second electrode unit and a ground signal to the first electrode unit simultaneously to move the droplet from the position corresponding to the first electrode unit to the position corresponding to the second electrode unit.

Optionally, each of the electrode units comprises a plurality of first electrodes and a plurality of second electrodes disposed at intervals, inputting the driving signal to the second electrode unit comprises inputting a second alternating current signal having a voltage value of about ±30 V to about 100 V and a frequency of about 1 kHz to about 2 kHz to the plurality of first electrodes and the plurality of second electrodes in the second electrode unit.

BRIEF DESCRIPTION OF THE DRAWINGS

The drawings are used to provide a further understanding of the technical solutions of the present disclosure, and constitute a part of the specification, which together with the embodiments of the present application are used to explain the technical solutions of the present disclosure, and do not constitute a limitation of the technical solutions of the present disclosure. The shapes and sizes of the various components in the drawings do not reflect true proportions, and are merely intended to illustrate the present disclosure.

DETAILED DESCRIPTION

The specific embodiments of the present disclosure are further described in detail below with reference to the drawings and embodiments. The following examples are intended to illustrate the disclosure but are not intended to limit the scope of the disclosure. It should be noted that, in the case of no conflict, the features in the embodiments and the embodiments in the present application could be arbitrarily combined with each other. Throughout the description of the disclosure, reference is made to FIGS. 1-11. When referring to the figures, like structures and elements shown throughout are indicated with like reference numerals. It should be understood that the dimensions of the various parts shown in the drawings are not drawn in the actual scale.

Figure 1:
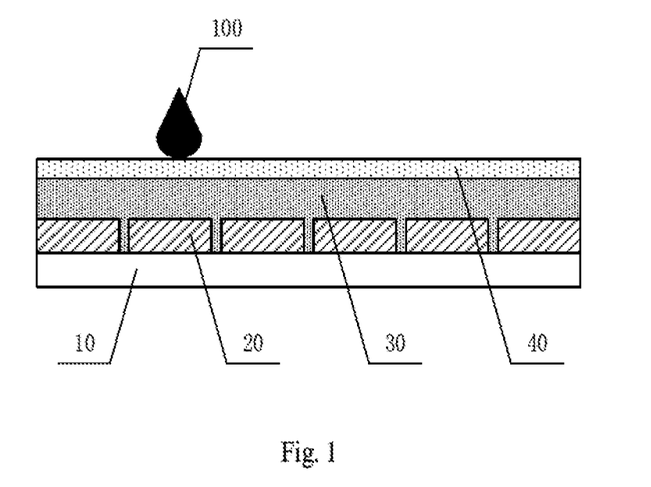
FIG. 1 is a schematic structural view of a microfluidic chip according to one embodiment of the present disclosure.

Embodiments of the present disclosure provide a microfluidic chip. FIG. 1 is a schematic structural diagram of a microfluidic chip according to one embodiment of the present disclosure. As shown in FIG. 1, the main structure of a microfluidic chip according to one embodiment of the present disclosure includes an electrode layer 20, a dielectric layer 30, and a lyophobic layer 40 which are sequentially formed on a base substrate 10. The electrode layer 20 is disposed on the base substrate 10, the dielectric layer 30 covers the electrode layer 20, and the lyophobic layer 40 is disposed on the electrode layer 20. The electrode layer 20 is used for droplet detection and droplet driving. The lyophobic layer 40 is used to carry the droplet 100 and cause the droplet 100 to move thereon.

Figure 2:
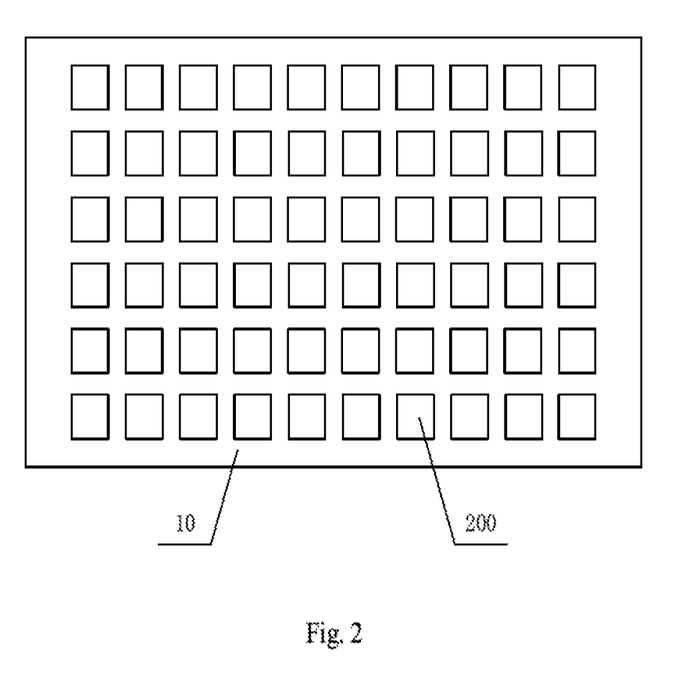
FIG. 2 is a schematic structural view of an electrode layer according to one embodiment of the present disclosure.

FIG. 2 is a schematic structural view of an electrode layer according to one embodiment of the present disclosure. In the embodiment of the present disclosure, the electrode layer includes a plurality of electrode units 200 disposed on the base substrate 10. Each of the electrode units 200 serves as a detecting and driving unit for performing droplet detection when a detection signal is applied and for performing droplet driving when a driving signal is applied. A plurality of electrode units 200 are regularly arranged to form an array of detection and driving electrodes. Each of the electrode units 200 may be provided in a square or rectangular shape with a side length of about 3 to about 5 mm and an interval between two adjacent electrode units 200 may be about 0.3 to about 0.5 mm. In the embodiment of the present disclosure, the regular arrangement refers to sequentially arranging along a set direction at a set interval, thereby forming a row arrangement or a column arrangement, or sequentially arranging in a mutually perpendicular two directions at a set interval, thereby forming a matrix arrangement, etc. As shown in FIG. 2, a plurality of electrode units 200 is arranged in a matrix. In an actual implementation, the shape and size of the electrode unit may be designed according to actual needs, such as a trapezoidal shape, a circular shape, or an elliptical shape, which is not limited in the embodiment of the present disclosure herein.

Each of the electrode units of the embodiment of the present disclosure includes a plurality of first electrodes and a plurality of second electrodes arranged in sequence, and the first electrodes and the second electrodes are spaced apart. In the embodiment of the present disclosure, that the first electrodes and the second electrodes are spaced apart means that one second electrode is disposed between the two first electrodes, and one first electrode is disposed between the two second electrodes. The first electrode and the second electrode are used, on the one hand, for impedance detection of the droplet when a detection signal is applied and, on the other hand, for real-time driving of the droplet when a driving signal is applied. In the embodiment of the present disclosure, the detection signal adopts a first alternating current signal of a magnitude of millivolts, for example, with a voltage value of 5 mV to 100 mV and a frequency of 10 Hz to 1 MHz. The driving signal adopts a second alternating current signal, for example, with a voltage value of ±(30 to 100) V and a frequency of 1 kHz to 2 kHz.

Figure 3:
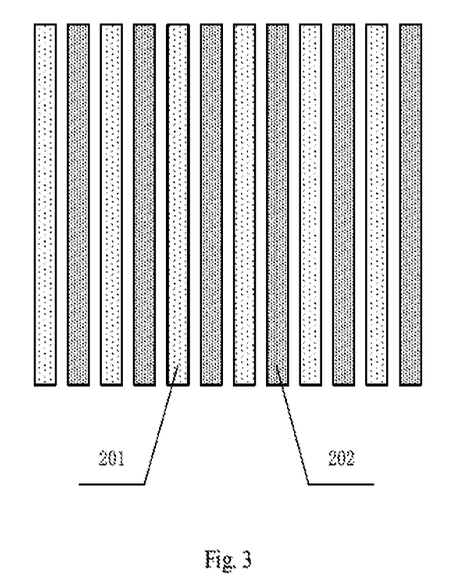
FIG. 3 is a schematic structural view of a strip-shaped electrode unit according to one embodiment of the present disclosure.

In one embodiment, the first electrode and the second electrode may be arranged 4 in a strip shape. FIG. 3 is a schematic structural view of a strip-shaped electrode unit according to one embodiment of the present disclosure. As shown in FIG. 3, the equivalent length of the strip shape is about 3 mm to about 5 mm, the equivalent width is about 100 μm to about 500 μm, the distance between the first electrode 201 and the second electrode 202 is about 10 μm to about 50 μm. The plurality of strip shapes is arranged in sequence along the width direction to form a micron-sized strip electrode array. In another embodiment, the first electrode and the second electrode may be in a block shape, the equivalent length and width of the block shape being about 100 μm to about 500 μm, and the spacing between the first electrode and the second electrode being about 10 μm to about 50 μm. The block shapes may be arranged in a matrix to form a micron-sized array of block electrodes. The above micron-sized electrode array can be applied to microfluidic chips of millimeter magnitude.

In actual implementation, the strip shape may be a rectangular strip, a trapezoidal strip or an arc strip, the block shape may be a rectangle, a trapezoid, a circle or an ellipse, and the shape and the size may be designed according to actual needs, which is not limited in the embodiments of the present disclosure herein.

Embodiments of the present disclosure provide a microfluidic chip, which is provided with a plurality of electrode units for performing droplet detection and droplet driving by utilizing a detection signal and a driving signal, thereby realizing integration of droplet detection and droplet driving on a microfluidic chip. Compared with the existing separated structures for droplet driving and detecting, the microfluidic chip of the embodiment of the present disclosure has the advantages of high integration, simple structure, simple operation, and the like. The microfluidic chip of the embodiment of the present disclosure not only realizes miniaturization, but also has high degree of automation, thereby improving the application efficiency of the digital microfluidic chip. Furthermore, it broadens its application range, effectively simplifies the structure of the on-chip laboratory system, and is of great significance for further optimizing the on-chip laboratory system. It has great development potential and broad application prospects.

The technical solutions of the embodiments of the present disclosure are described in detail below through specific embodiments.

Figure 4:
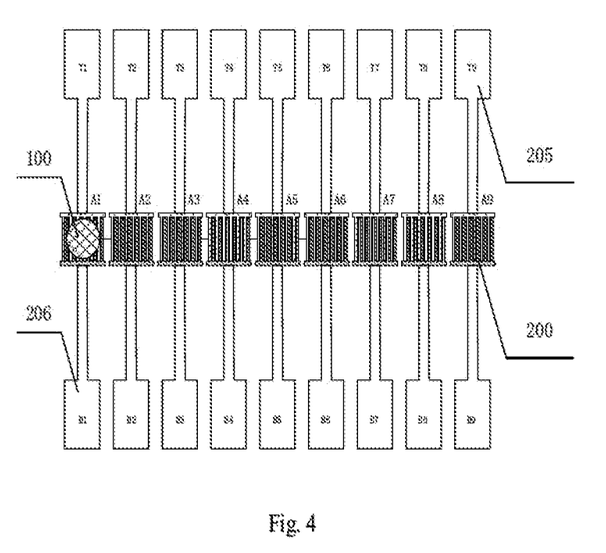
FIG. 4 is a schematic structural view of a microfluidic chip according to one embodiment of the present disclosure.
Figure 5:
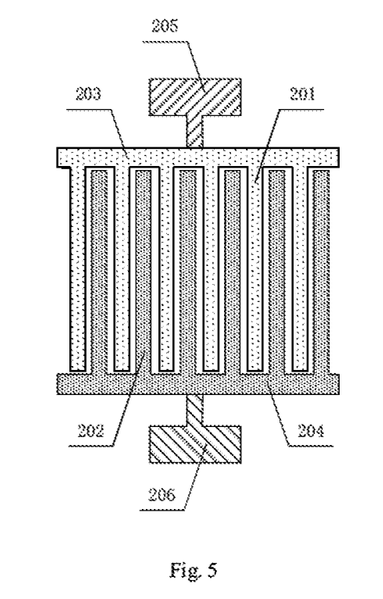
FIG. 5 is a schematic structural view of an electrode unit according to one embodiment of the present disclosure.

FIG. 4 is a schematic structural view of a microfluidic chip according to one embodiment of the present disclosure, and FIG. 5 is a schematic structural view of an electrode unit according to one embodiment of the present disclosure. As shown in FIG. 4, the microfluidic chip of this embodiment includes an electrode layer, a dielectric layer and a lyophobic layer sequentially formed on the base substrate, and the electrode layer includes a plurality of electrode units 200 formed on the base substrate. Each electrode unit 200 serves as a detecting and driving unit, and a plurality of electrode units 200 are regularly arranged to form an array of detecting and driving electrodes. As shown in FIG. 5, the electrode unit of the embodiment includes a plurality of first electrodes 201 and a plurality of second electrodes 202. The first electrode 201 and the second electrode 202 are rectangular strips, and the length of the rectangular strip is about 3 mm to about 5 mm, and the width thereof is about 100 μm to about 500 μm. The rectangular strips are sequentially arranged in the width direction, and the interval between the rectangular strips is about 10 μm to about 50 μm. The number of the first electrodes and the second electrodes may be increased or decreased according to a specific application scenario, and the embodiment does not limit the number. The electrode unit may further include a first connecting block 203 that connects all of the first electrodes 201, and a second connecting block 204 that connects all of the second electrodes 202. The first ends of the plurality of first electrodes 201 (the upper ends shown in FIG. 5) are integrally connected by the first connecting block 203 to form a first comb electrode. The second ends (the lower ends shown in FIG. 5) of the plurality of second electrodes 202 that are away from the first ends are integrally connected by the second connecting block 204 to form a second comb electrode. The opening direction of the first comb electrode and the opening direction of the second comb electrode are oppositely disposed to form an electrode unit of an interdigital electrode array of the present embodiment.

The microfluidic chip of this embodiment may further include a plurality of first input electrodes 205 and a plurality of second input electrodes 206. Each first input electrode 205 is connected to a first connecting block 203 of one electrode unit 200, and each second input electrode 206 is connected to a second connecting block 204 of one electrode unit 200. The first input electrode 205 is configured to input a detection signal and a driving signal to all of the first electrodes 201 through the first connecting block 203, and the second input electrode 206 is configured to input a detection signal and a driving signal to all the second electrodes 202 through the second connecting block 204. As such, the electrode unit of the present embodiment realizes droplet detection and droplet driving. In actual implementation, the shape, the size, and the connection manner of the first connecting block, the second connecting block, the first input terminal, and the second input terminal may be designed according to actual needs, and are not specifically limited in the present embodiment herein.

The microfluidic chip of the embodiment shown in FIG. 4 includes nine electrode units 200 arranged in sequence, and the electrode units A1 to A9 are sequentially arranged in the horizontal direction. Each electrode unit 200 is connected with a top electrode T, that is, the top electrode T1 to the top electrode T9, and each electrode unit is also connected with a bottom electrode B, that is, the bottom electrode B1 to the bottom electrode B9. The top electrode T is the first input electrode 205 shown in FIG. 5, and the bottom electrode is the second input electrode 206 shown in FIG. 5.

Taking a droplet driving and detection as an example, the operational principle of the microfluidic chip of this embodiment is described in detail below.

At the first time t1, the droplet 100 is located at the position of the electrode unit A1. A detection signal is applied to the electrode unit A1 through the top electrode T1 and the bottom electrode B1. At the same time, an external processing circuit (not shown) reads the impedance signal generated by the first electrode and the second electrode in the electrode unit A1 through the top electrode T1 and the bottom electrode B1. The external processing circuit processes the obtained impedance signal, that is, completes the impedance detection of the droplet 100 at the corresponding position of the electrode unit A1.

At the second time t2, a driving signal is applied to the electrode unit A2 through the top electrode T2 and the bottom electrode B2 while the electrode unit A1 is kept in the ground state. Driven by the driving signal, the droplet 100 is moved to the position where the electrode unit A2 is.

At the third time t3, the droplet 100 is located at the position where the electrode unit A2 is located, and a detection signal is applied to the electrode unit A2 through the top electrode T2 and the bottom electrode B2. At the same time, the external processing circuit reads the impedance signals generated by the first electrode and the second electrode in unit A2 through the top electrode T2 and the bottom electrode B2. Then, the impedance signals obtained are processed by the external processing circuit to complete the impedance detection of the droplet 100 at the corresponding position of the electrode unit 2.

At the fourth time t4, a driving signal is applied to the electrode unit A3 through the top electrode T3 and the bottom electrode B3 while the electrode unit A2 is kept in the ground state. Driven by the driving signal, the droplet 100 is moved to the position where the electrode unit 3 is.

Likewise, the impedance detection of the droplet at each position and the stepwise movement of the droplet can be achieved. In biological assays, the occurrence of reactions between biological samples (e.g., specific binding of antigens and antibodies, binding between DNA strands, etc.) can result in changes in the internal impedance of the droplets. As the workflow described above, if the surface of the electrode unit A1 and the electrode unit A2 are biologically pretreated in advance, the effective information such as the concentration or composition of the biological sample in the droplet can be inferred based on the change of the two impedance detections.

Figure 6:
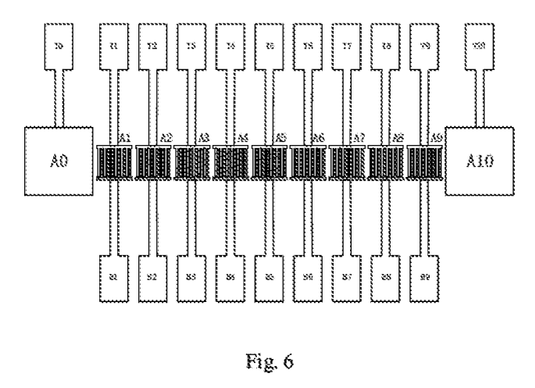
FIG. 6 is a schematic view showing the application of a microfluidic chip according to one embodiment of the present disclosure.

The operational principle of the microfluidic chip of the present embodiment is further illustrated by taking driving and detecting a group of biological samples containing different concentrations of specific antigens (Ag) as an example. FIG. 6 is a schematic view of the application of the microfluidic chip according to one embodiment of the present disclosure. As shown in FIG. 6, A0 is a liquid storage area for adding a test sample to the electrode unit, that is, the test sample is added from the liquid storage area A0. A10 is a waste liquid area for receiving the test sample flowing out from the electrode unit, that is, flowing out of the electrode unit to the waste liquid area A10 after the sample test is completed. The liquid storage area A0 and the waste liquid area A10 may be a square shape and have a side length of 6 mm to 10 mm. Between the liquid storage area A0 and the waste liquid area A10 is a droplet driving and detecting area formed by nine sequentially arranged electrode units, each of which has a size of 3 mm to 5 mm.

First, biological pretreatment is performed on the surface of the microfluidic chip (the surface corresponding to each electrode unit). Since a specific antigen only binds a specific antibody, it is necessary to pre-modify a surface of the microfluidic chip before detection with a layer of an antibody (Ab) that could specifically binds the Ag. In one embodiment, a modification solution containing biologically modified substance, that is, a solution containing Ab is added to the liquid storage area. Then, droplets containing Ab are respectively moved to the respective driving electrodes by sequentially applying driving signals to the electrode units A1 to A9. The biological modification of the surface of each electrode unit is accomplished through a series of standard biological processes, and excess reagents can be discharged through the waste liquid zone A10.

Subsequently, driving of the samples to be tested is performed. Assuming that there are eight different concentrations of the test solution, the test solution of each concentration is sequentially moved to a corresponding position of one of the electrode units A2 to A9 respectively by inputting a driving signal to the electrode unit. A background solution containing no Ag is moved to the corresponding position of electrode unit A1, and the background solution containing no Ag is used as a test control sample.

Subsequently, detection of the samples to be tested is performed. After the specific binding of the antigen and the antibody occurs, detection signals are input to the electrode units A1 to A9 respectively. Since the binding amounts of Ag and Ab for different concentrations of solutions are different, the corresponding impedance signals generated are different. Thus, according to the impedance data of each electrode unit, effective information such as the Ag concentration in each sample to be tested can be obtained.

Figure 7:
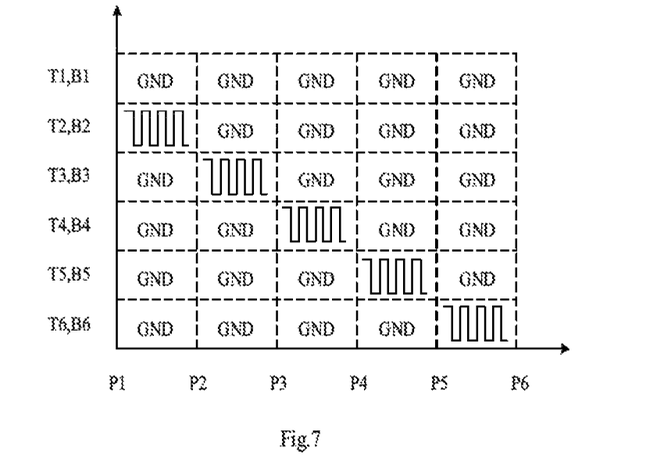
FIG. 7 is a timing chart of a driving signal according to one embodiment of the present disclosure.

FIG. 7 is a timing chart of the driving signal according to one embodiment of the present disclosure. Taking a droplet moving from the electrode unit A1 to the electrode unit A6 as an example, the driving signals and driving timings required to complete the droplet driving function are described. As shown in FIG. 7, when the droplet is located in the electrode unit A1, a second alternating current signal having a voltage value of ±100 V and a frequency of 1 kHz is applied to the electrode unit A2 through the top electrode T2 and the bottom electrode B2 during the period from P1 to P2. The other electrodes are all kept in a grounded state so as to move the droplet to the position of the electrode unit A2. During the period from P2 to P3, a driving signal is applied to the electrode unit A3 through the top electrode T3 and the bottom electrode B3 while the other top and bottom electrodes are kept in a grounded state, and the droplets are moved to the position of the electrode unit A3 . . . . During the period from P5 to P6, a driving signal is applied to the electrode unit A6 through the top electrode T6 and the bottom electrode B6 while the other top and bottom electrodes are kept in a grounded state, and the droplets are moved to the position of the electrode unit A6. Likewise, stepwise movement of the droplets can be achieved.

Figure 8:
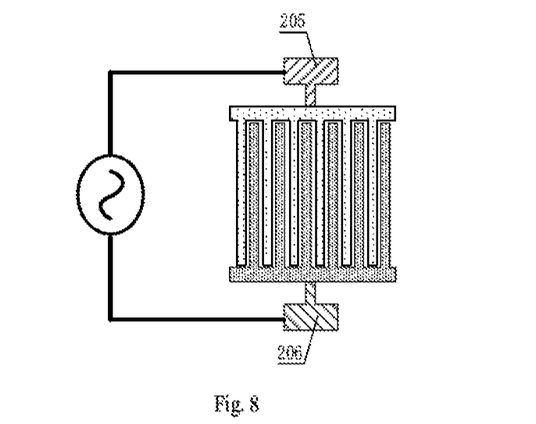
FIG. 8 is a schematic view of an input signal according to one embodiment of the present disclosure.

FIG. 8 is a schematic illustration of an input signal in accordance with one embodiment of the present disclosure. As shown in FIG. 8, the first input electrode 205 and the second input electrode 206 are respectively connected to two ends of the AC output apparatus. Wherein, the detection signal is a first alternating current signal of the magnitude of millivolts. The voltage value of the detection signal is about 5 mV to 100 mV, and the frequency of the detection signal is about 10 Hz to 1 MHz. The specific voltage value and frequency of the detection signal can be designed according to the actual sample to be tested. The driving signal is a second alternating current signal, the voltage value thereof is ±30 V to 100 V, and the frequency thereof is about 1 kHz to 2 kHz. The specific voltage value and frequency of the driving signal can be determined according to the designed speed of droplet movement. In actual implementation, the driving signal can also adopt a DC voltage signal used by the existing microfluidic chip. The technical principles of impedance detection and droplet driving employed in this embodiment are the same as those in the prior art, and the technical means for applying an alternating current signal to the top electrode and the bottom electrode are well known to those skilled in the art and will not be described herein.

Figure 9:
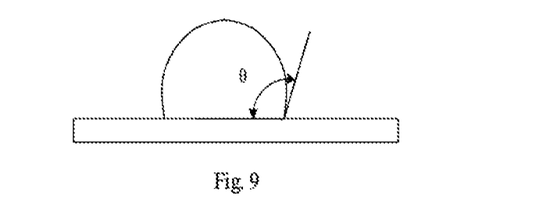
FIG. 9 is a schematic view of a droplet contact angle.

Surface wetting is one of main properties of a solid surface. If the liquid is uniformly dispersed on the surface without forming droplets, such surface is considered to be inherently lyophilic, thereby allowing liquid dispersion. Conversely, if the liquid forms droplets on the surface, such surface is considered to be inherently lyophobic. The wettability of a solid surface is typically determined by contact angle (CA) measurement. FIG. 9 is a schematic illustration of the droplet contact angle. As shown in FIG. 9, for liquid on a horizontal surface, the contact angle θ is considered to be the result of three different types of surface tension at the solid/liquid/gas interface, and the contact angle θ is represented by the Young equation:

$$\cos\theta = \frac{\gamma_{sol\text{-}gas} - \gamma_{sol\text{-}liq}}{\gamma_{gas\text{-}liq}}$$

Wherein, $\gamma_{sol\text{-}gas}$, $\gamma_{sol\text{-}liq}$ and $\gamma_{gas\text{-}liq}$ are surface tension coefficients between solid-gas, solid-liquid and gas-liquid, respectively. Based on the Young's equation, lyophilic means that the contact angle of the droplet on the solid surface is less than 90°, while lyophobic means that the contact angle of the droplet on the solid surface is greater than 90°.

When the droplet is located in the electrode unit A1, when there is no applied electric field, the droplet remains in a lyophobic state, and the droplet does not move. When the second alternating current signal is applied to the electrode unit A2, the electric field formed by the second alternating current signal changes the lyophobic state (contact angle θ) of the side of the droplet adjacent to the electrode unit A2, for example, from the lyophobic state to the lyophilic state (the contact angle θ is decreased). As a result, the balance of the droplet is broken, and the droplet is driven to move toward the position where the electrode unit A2 is located.

In this embodiment, the microfluidic chip may further include a control unit configured to generate a driving signal according to a moving direction and/or a speed of the preset droplet and send the signal to the electrode unit to control the moving direction and/or speed of the droplet. Specifically, the control unit first determines the first electrode unit corresponding to the droplet position. Then, the control unit determines the second electrode unit adjacent to the first electrode unit in the moving direction according to the preset moving direction of the droplet. Finally, the amplitude of the driving signal to the second electrode unit is determined based on the movement speed of the droplet preset in advance. The structure of the above control unit and the manner of being disposed on the microfluidic chip are similar to those of the existing structure, and are not described herein again.

The process of preparing the microfluidic chip according to one embodiment of the present disclosure includes: first, preparing an array of electrode units by a patterning process on the base substrate to form an electrode layer. Subsequently, a dielectric layer is deposited or coated on the electrode layer. A layer of lyophobic layer is then applied over the dielectric layer. Among them, the preparation of the electrode units and the coating of the dielectric layer and the lyophobic layer can adopt existing mature production process, and will not be described herein. The electrode in the electrode unit may be made of a metal material such as Mo or Al, or a transparent conductive material such as ITO or IZO. The number of the electrode units may be increased or decreased according to the specific application scenario, and the specific number is not limited in this embodiment.

The embodiment provides a novel microfluidic chip, which improves the structure of the electrode units in the conventional microfluidic chip. The design of convention electrode unit having complete block shape is changed to be an interdigital electrode array, thereby realizing droplet detection and driving function. This breaks the traditional way of separated droplet manipulation and detection in the on-chip laboratory system, and this is conducive to the development of the on-chip laboratory system towards miniaturization and high integration. Since the area occupied by the electrodes in the interdigital electrode array is much larger than the area of the open space, the ratio of the area of electrodes to the area of the open space is high. Thus, the driving effect according to one embodiment of the present disclosure is similar to that for existing whole surface electrode, and there is almost no difference between them. When it is necessary to drive the droplets, a driving signal is applied to the electrode unit, and normal droplet driving can be realized. When the droplet needs to be detected, a detection signal is applied to the electrode unit, and impedance detection of the droplet can be achieved. The integration of the droplet driving function and the droplet detection function is realized by the time-division of the driving signal and the detection signal, that is, the driving signal and the detection signal are alternately input. Compared with the existing separated structures for droplet driving and detecting, since the microfluidic chip of the embodiment integrates the droplet driving function and the droplet detecting function, the external detecting apparatus is omitted. Thus, the integration degree is high. Since the microfluidic chip of the embodiment only needs one base substrate to drive the directional movement of the droplets, so the structure is simple. Since the microfluidic chip of the embodiment only needs to divide the input signal into a driving timing and a detection timing, the droplet driving and detecting can be simultaneously realized. Therefore, the control is simple, the detection process is simplified, the detection efficiency is improved, and the detection cost is also reduced.

In summary, the microfluidic chip of the embodiment has the advantages of high integration, simple structure, simple operation, etc. The microfluidic chip of the present embodiment not only realizes miniaturization, but also has high degree of automation, improves the application efficiency of the digital microfluidic chip, and broadens the application range thereof. The microfluidic chip of the present embodiment effectively simplifies the structure of the on-chip laboratory system and further improves the integration of the on-chip laboratory system. It is of great significance for further optimizing the on-chip laboratory system, and has great development potential and broad application prospects.

At present, an existing electrode-driven microfluidic chip is generally a bi-planar sandwich structure including a first substrate and a second substrate disposed opposite to each other. The first substrate may include a first electrode, a first dielectric layer, and a first lyophobic layer sequentially formed on a base substrate. The second substrate may include a second electrode, a second dielectric layer and a second lyophobic layer sequentially formed on a base substrate. The droplet may be disposed between the first lyophobic layer and the second lyophobic layer. Since the existing bi-planar sandwich structure adopts two substrates each provided with an electrode, the structure and the preparation process thereof are more complicated, and the preparation cost is high. Since the electrodes of the two substrates need to be connected to the external driving circuit, the wiring is complicated and the design is cumbersome. In this embodiment of the present disclosure, the innovative design of the electrode unit is carried out without changing the driving mode of the existing microfluidic chip, and the droplet detecting function is added on the original droplet driving function. Compared with the existing biplanar sandwich structure, the microfluidic chip of this present embodiment can drive the directional movement of the droplet by only one substrate. Therefore, the microfluidic chip of the present embodiment has a simple structure and does not require any additional process. By dividing the input signal into driving timing and detecting timing, the droplet control and detection can be realized simultaneously on the microfluidic chip. As such, the manufacturing process is simple, the production cost is low, and the microfluidic chip of the present embodiment is more suitable for mass production.

Figure 10:
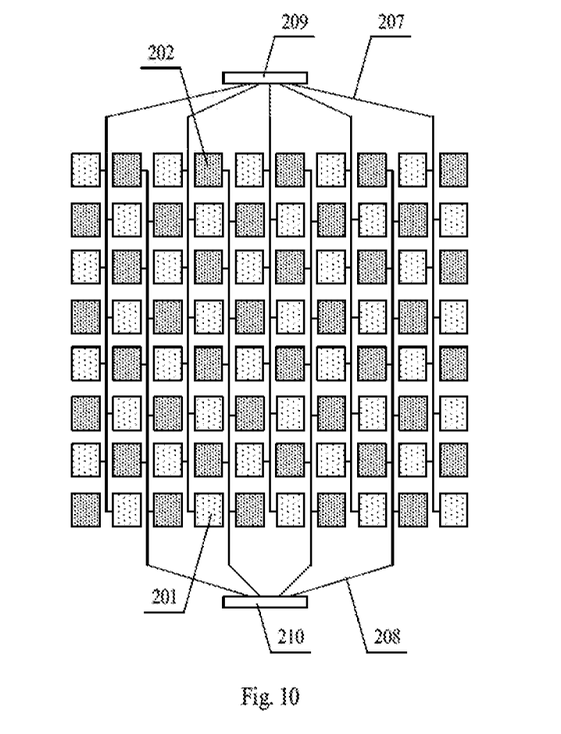
FIG. 10 is a schematic structural view of an electrode unit in a microfluidic chip according to one embodiment of the present disclosure.

In one embodiment, the main structure of the microfluidic chip of this embodiment is substantially the same as that of the foregoing embodiments, including an electrode layer, a dielectric layer and a lyophobic layer which are sequentially formed on the base substrate. The electrode layer includes a plurality of electrode units formed on the base substrate, each electrode unit is used as a detecting and driving unit. The plurality of electrode units may be arranged in a matrix to form an array of detecting and driving electrodes. Different from the foregoing embodiments, the driving unit of this embodiment is a matrix form of electrode array, that is, a two-dimensional electrode array. FIG. 10 is a schematic structural view of an electrode unit in a microfluidic chip according to one embodiment of the present disclosure. As shown in FIG. 10, the electrode unit of the embodiment includes a plurality of first electrodes 201 and a plurality of second electrodes 202 disposed at intervals. The first electrode 201 and the second electrode 202 are each a rectangular block. The equivalent length and width of the rectangular block is from about 100 μm to about 500 μm, and the spacing between the electrodes is from about 10 μm to about 50 μm. Wherein, that the first electrode 201 and the second electrode 202 are spaced apart means that the upper, lower, left and right sides of the first electrode 201 are all the second electrode 202, and the upper, lower, left and right sides of the second electrode 202 are all the first electrodes 201, thereby forming the electrode units having the matrix form of electrode array of the present embodiment.

The electrode unit of this embodiment farther includes a first connection line 207 connecting all of the first electrodes 201, and a second connection line 208 connecting all of the second electrodes 202. The microfluidic chip of this embodiment further includes a plurality of first input terminals 209 and a plurality of second input terminals 210. Each of the first input terminals 209 is connected to all the first connection lines 207 of one electrode unit, and each of the second input terminals 210 connects all the second connection lines 208 of one electrode unit. The first input terminal 209 is configured to input a detection signal and a driving signal to all the first electrodes 201 through the first connection line 207, and the second input terminal 210 is configured to input a detection signal and a driving signal to all the second electrodes 202 through the second connection line 208. As such, the electrode unit of the embodiment realizes droplet detection and droplet driving.

The driving and detecting principle of the microfluidic chip of this embodiment is the same as that of the foregoing embodiments described above. When it is necessary to drive the droplets, a second alternating current signal (drive signal) having a voltage value of about 30 V to about 100 V and a frequency of about 1 kHz to about 2 kHz is applied to all of the first and second electrodes in the electrode unit, thereby achieving normal operation of droplet driving. When it is necessary to detect the droplets, a first alternating current signal (detection signal) having a voltage value of about 5 mV to about 100 mV and a frequency of about 10 Hz to about 1 MHz is applied to all of the first and second electrodes in the electrode unit, thereby achieving real-time impedance detection of droplets.

The microfluidic chip of the embodiment also has the advantages of high integration, simple structure and simple control, and it not only realizes miniaturization, but also has high degree of automation. Further, since the electrode unit of the present embodiment employs a matrix form of electrode array, the accuracy of droplet detection and droplet driving can be improved.

Figure 11:
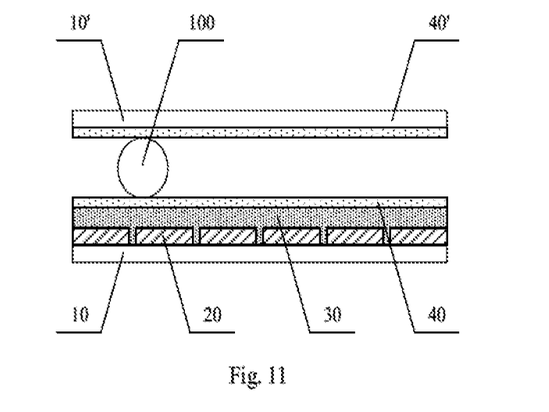
FIG. 11 is a schematic structural view of a microfluidic chip according to one embodiment of the present disclosure.

FIG. 11 is a schematic structural view of a microfluidic chip according to one embodiment of the present disclosure. As shown in FIG. 11, the main structure of the microfluidic chip of the present embodiment includes a substrate and an opposite substrate which are oppositely disposed, and the substrate includes a base substrate 10, an electrode layer 20, a dielectric layer 30, and a lyophobic layer 40, which has the same structure as that of the foregoing embodiments. The opposite substrate includes only the opposite base substrate 10' and the lyophobic layer 40'. The droplets are disposed between the lyophobic layer 40 of the substrate and the lyophobic layer 40' of the opposite substrate.

Although the microfluidic chip of the embodiment also adopts two substrates, the driving and detecting functions are realized by one substrate, and no electrode is disposed on the opposite substrate. The overall structure is simpler than the existing bi-planar sandwich structure. The microfluidic chip of the embodiment also has the advantages of high integration, simple structure and simple control, and it not only realizes miniaturization, but also has high degree of automation. Further, the structural form of the embodiment can realize four operation modes of droplets, that is, generation, movement, fusion, and separation, and the application field is wider.

Although the technical solutions of the embodiments of the present disclosure have been described in the form of an interdigital electrode array and a matrix form of electrode array, a single substrate structure and a dual substrate structure, the structural form of the microfluidic chip of the present disclosure is not limited to the above. For example, for a dual substrate structure, two substrates both provided with an electrode layer may apply, and the electrode layer of one substrate is provided with a plurality of first electrodes, and the electrode layer on the other substrate is provided with a plurality of second electrodes. The plurality of first electrodes and the plurality of second electrodes form an interdigital electrode array or a matrix form of electrode array, and droplet driving and droplet detection can also be simultaneously performed. For another example, for the dual substrate structure, the opposite substrate may not be provided with a lyophobic layer, and only the grounding and sealing functions are provided. Based on the technical idea of the present disclosure, those skilled in the art can also expand various structural forms, which is not enumerated herein.

Based on the technical idea of the embodiments of the present disclosure, an embodiment of the present disclosure further provides a method for detecting and driving of a microfluidic chip, where the microfluidic chip comprises an electrode layer, a dielectric layer and a lyophobic layer sequentially formed on a base substrate. The electrode layer includes a plurality of electrode units arranged in a regular manner, each of the electrode units including a plurality of first electrodes and a plurality of second electrodes. The first electrodes and the second electrodes are spaced apart. The method for detecting and driving the microfluidic chip of this embodiment includes:

Performing droplet detection using a first electrode unit, wherein the first electrode unit is an electrode unit corresponding to a position of a droplet; and Performing droplet driving using a second electrode unit to move the droplet to a position corresponding to the second electrode unit, and the second electrode unit is adjacent to the first electrode unit.

In one embodiment, performing droplet detection using the first electrode unit includes:

Inputting a detection signal to the first electrode unit; and

Reading the impedance signal generated by the first electrode unit and outputting the impedance signal to an external processing circuit for processing.

Wherein, each of the electrode units includes a plurality of first electrodes and a plurality of second electrodes disposed at intervals, and inputting a detection signal to the first electrode unit includes: inputting a first alternating current signal having a voltage value of 5 mV to 100 mV and a frequency of 10 Hz to 1 MHz to the plurality of first electrodes and the plurality of second electrodes in the first electrode unit.

In one embodiment, performing the droplet driving using the second electrode unit to move the droplet to a position corresponding to the second electrode unit includes:

Inputting a driving signal to the second electrode unit and inputting a ground signal to the first electrode unit simultaneously to move the droplet located at a corresponding position of the first electrode unit to a corresponding position of the second electrode unit.

Wherein each of the electrode units includes a plurality of first electrodes and a plurality of second electrodes disposed at intervals, and inputting a driving signal to the second electrode unit includes inputting a second alternating current signal having a voltage value of ±30 V to 100 V and a frequency of 1 kHz to 2 kHz to the plurality of first electrodes and the plurality of second electrodes in the second electrode unit.

When driving and detecting a droplet, the detection and driving method of the microfluidic chip specifically includes Steps S11 and S12:

Step S11 includes applying a detection signal to the first electrode unit at a first moment when the droplet is located at a corresponding position of the first electrode unit, and the external processing circuit reads the impedance signal generated by the first electrode unit;

S12 includes applying a driving signal to the second electrode unit at a second moment when the droplet is located at a corresponding position of the first electrode unit, and simultaneously inputting a ground signal to the first electrode unit, so that the droplet is driven by the driving signal to move from the corresponding position of the first electrode unit to a corresponding position of the second electrode unit.

When driving and detecting a group of droplets, the detection and driving method of the microfluidic chip specifically includes Steps S21-S23:

Step S21 includes providing a modification solution containing a biologically modified substance, sequentially applying a driving signal to the plurality of electrode units, moving the droplets of the modification solution to the respective driving electrodes, and performing biological modification on the surface of each electrode unit;

S22 includes providing a test solution, moving the droplets of the test solution to the set of electrode units; Other kinds of test solutions are sequentially processed in this same manner;

S23 includes applying a detection signal to the plurality of electrode units, and reading an impedance signal of each electrode unit to obtain valid information of each test solution.

In actual implementation, the detection and driving method of the microfluidic chip further includes:

detecting the position of the droplet by a detection unit and sending the position of the droplet to the control unit;

generating a driving signal by the control unit based on the position of the droplet and a predetermined moving direction and/or velocity of the droplet and transmitting the driving signal to the corresponding electrode unit.

Specifically, the control unit determines the first electrode unit in which the droplet is located according to the position of the droplet, and determines a second electrode unit adjacent to the first electrode unit according to a predetermined moving direction of the droplet, and generate the driving signal according to the preset movement speed of the droplet and transmit it to the second electrode unit.

The embodiment provides the detection and driving method of the microfluidic chip. By alternately inputting the driving signal and the detection signal through the time-division driving signal and detection signal, the droplet detecting and droplet driving functions are realized. Since the driving and detecting of the droplets are all completed by the electrode unit in the embodiment, the input signal is only divided into driving timing and detection timing. Accordingly, the advantages of this embodiment include simple control and high integration. Furthermore, the detection efficiency is improved.

Based on the foregoing technical solution, one embodiment of the present disclosure further provides an on-chip laboratory system, including the foregoing microfluidic chip.

In the description of the embodiments of the present disclosure, it is to be understood that the orientation or positional relationship of the terms "middle," "upper," "lower," "front," "back," "vertical," "horizontal," "top," "bottom," "inside," "outside," and the like is based on the orientation or positional relationship shown in the drawings, and is merely for the convenience of the description of the disclosure and the simplified description, and does not indicate or imply that the apparatus or component referred to must has the specific orientation, construction and operation in a particular orientation and are not to be construed as limiting the disclosure.

In the description of the embodiments of the present disclosure, it should be noted that the terms "installation," "connected," and "coupled" are to be understood broadly unless clearly defined and limited. For example, it may be a fixed connection, a detachable connection, or an integral connection; it may be a mechanical connection or an electrical connection; it may be directly connected, or may be indirectly connected through an intermediate medium, or may be the internal communication of the two components. The specific meaning of the above terms in the present disclosure can be understood in a specific case by those skilled in the art.

While the embodiments of the present disclosure have been described above, the described embodiments are merely for the purpose of understanding the disclosure and are not intended to limit the disclosure. Any modification and variation in the form and details of the embodiments may be made by those skilled in the art without departing from the spirit and scope of the disclosure. However, the scope of the disclosure is to be determined by the scope of the appended claims.

The principles and the embodiments of the present disclosure are set forth in the specification. The description of the embodiments of the present disclosure is only used to help understand the apparatus and method of the present disclosure and the core idea thereof. Meanwhile, for a person of ordinary skill in the art, the disclosure relates to the scope of the disclosure, and the technical scheme is not limited to the specific combination of the technical features, but also covers other technical schemes which are formed by combining the technical features or the equivalent features of the technical features without departing from the inventive concept. For example, a technical scheme may be obtained by replacing the features described above as disclosed in this disclosure (but not limited to) with similar features.

DESCRIPTION OF THE REFERENCE SIGNS

10—substrate; 20—electrode layer; 30—dielectric layer; 40—lyophobic layer; 100—droplet; 200—electrode unit; 201—first electrode; 202—second electrode; 203—first connection block, 204—second connection block; 205—first input electrode; 206—second input electrode; 207—first connection line; 208—second connection line; 209—first input end; 210—second input end; 10'—opposite substrate; 40'—opposite substrate lyophobic layer.

What is claimed is:

1. A microfluidic chip, comprising a substrate, the substrate comprising:
    an electrode layer on a base substrate, the electrode layer comprising a plurality of electrode units,
    a dielectric layer on the electrode layer, and
    a lyophobic layer on the dielectric layer;
    wherein each of the plurality of electrode units is configured to realize both droplet detection and droplet driving in response to a detection signal and a driving signal respectively;
    each of the electrode units comprises a plurality of first electrodes and a plurality of second electrodes disposed at intervals;
    each of the first electrodes and each of the second electrodes are in a strip shape; and
    each of the electrode units further comprises a first connecting block connecting first ends of the first electrodes and a second connecting block connecting second ends of the second electrodes, thereby forming an array of interdigital electrodes;
    the microfluidic chip further comprises a plurality of first input electrodes and a plurality of second input electrodes, each of the plurality of first input electrodes being connected to a first connecting block of one electrode unit, each of the plurality of second input electrodes being connected to a second connecting block of one electrode unit; and
    the first input electrodes and the second input electrodes are configured to input the detection signal and the drive signal to the first electrodes and the second electrodes through the first connecting block and the second connecting block respectively.

2. The microfluidic chip according to claim 1, wherein the strip shape has a length of about 3 mm to about 5 mm and a width of about 100 μm to about 500 μm, and the intervals between the first electrodes and the second electrodes are in a range about 10 μm to 50 μm.

3. The microfluidic chip according to claim 1, wherein each of the plurality of first electrodes and each of the plurality of second electrode are in a block shape.

4. The microfluidic chip according to claim 3, wherein the block shape has a length of about 100 μm to about 500 μm and a width of about 100 μm to about 500 μm, and the intervals between the first electrodes and the second electrodes are in a range of about 10 μm to about 50 μm.

5. The microfluidic chip according to claim 3, wherein each of the electrode units further comprise a first connection line and a second connection line, the first connection line connecting all of the plurality of first electrodes, the second connection line connecting all of the plurality of second electrodes, thereby forming a matrix form of electrode array.

6. The microfluidic chip according to claim 5, wherein the microfluidic chip further comprises a plurality of first input terminals and a plurality of second input terminals, each of the first input terminals being connected to a first connection line of one electrode unit, each of the second input terminals being connected to a second connection line of one electrode unit, and the first input terminals and the second input terminals are configured to input the detection signal and the drive signal to the first electrodes and the second electrodes through the first connection line and the second connection line, respectively.

7. The microfluidic chip according to claim 1, wherein each of the plurality of electrode units has a square or rectangle shape, with a side length of about 3 mm to about 5 mm, and an interval between two adjacent electrode units is about 0.3 mm to about 0.5 mm.

8. The microfluidic chip according to claim 1, wherein the detection signal comprises a first alternating current signal having a voltage value of about 5 mV to about 100 mV and a frequency of about 10 Hz to about 1 MHz; and the driving signal comprises a second alternating current signal having a voltage value of about ±30 V to 100 V and a frequency of about 1 kHz to 2 kHz.

9. The microfluidic chip according to claim 1, further comprising an opposite substrate, wherein the opposite substrate comprising a base substrate and a lyophobic layer, and the droplets are disposed between the lyophobic layers of the substrate and the opposite substrate.

10. The microfluidic chip according to claim 1, further comprising a liquid storage zone and a waste liquid zone, wherein the liquid storage zone is configured for adding a test sample to the electrode units, the waste liquid zone is configured for receiving a test sample flowing out of the electrode units, the plurality of electrode units being disposed between the liquid storage zone and the waste liquid zone.

11. An on-chip laboratory system, comprising the microfluidic chip of claim 1.

12. A detection and driving method of a microfluidic chip, wherein the microfluidic chip comprising an electrode layer, a dielectric layer and a lyophobic layer sequentially formed on a base substrate, and the electrode layer comprising a plurality of electrode units arranged regularly; the detection and driving method comprising:

performing droplet detection using a first electrode unit, wherein the first electrode unit is an electrode unit corresponding to a position of droplet; and performing droplet driving using a second electrode unit to move the droplet to a position corresponding to the second electrode unit, and the second electrode unit is adjacent to the first electrode unit;

wherein performing droplet detection using the first electrode unit comprises:

inputting a detection signal to the first electrode unit; and reading impedance signal generated by the first electrode unit and outputting the impedance signal to an external processing circuit for processing.

13. The detection and driving method according to claim 12, wherein each of the electrode units comprises a plurality of first electrodes and a plurality of second electrodes disposed at intervals, inputting the detection signal to the first electrode unit comprises inputting a first alternating current signal having a voltage value of about 5 mV to about 100 mV and a frequency of about 10 Hz to about 1 MHz to the plurality of first electrodes and the plurality of second electrodes in the first electrode unit.

14. The detection and driving method according to claim 13, wherein performing the droplet driving using the second electrode unit to move the droplet to the position corresponding to the second electrode unit comprises:

inputting a driving signal to the second electrode unit and a ground signal to the first electrode unit simultaneously to move the droplet from the position corresponding to the first electrode unit to the position corresponding to the second electrode unit.

15. The detection and driving method according to claim 14, wherein each of the electrode units comprises a plurality of first electrodes and a plurality of second electrodes disposed at intervals, inputting the driving signal to the second electrode unit comprises inputting a second alternating current signal having a voltage value of about ±30 V to about 100 V and a frequency of about 1 kHz to about 2 kHz to the plurality of first electrodes and the plurality of second electrodes in the second electrode unit.

* * * * *